June 5, 1956 S. E. SURGI 2,748,809
CHAIN SAW ATTACHMENT WITH LUBRICATING MEANS
Filed Nov. 20, 1952 2 Sheets-Sheet 1

Sidney E. Surgi
INVENTOR.

BY *(signatures)*
Attorneys

June 5, 1956     S. E. SURGI     2,748,809
CHAIN SAW ATTACHMENT WITH LUBRICATING MEANS
Filed Nov. 20, 1952     2 Sheets-Sheet 2
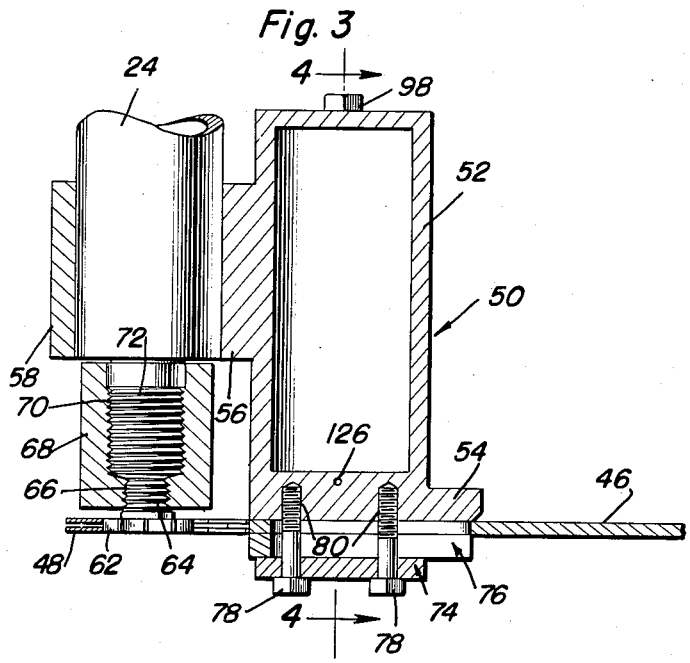
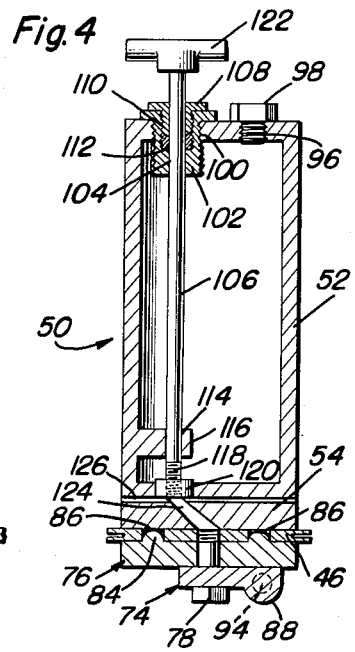
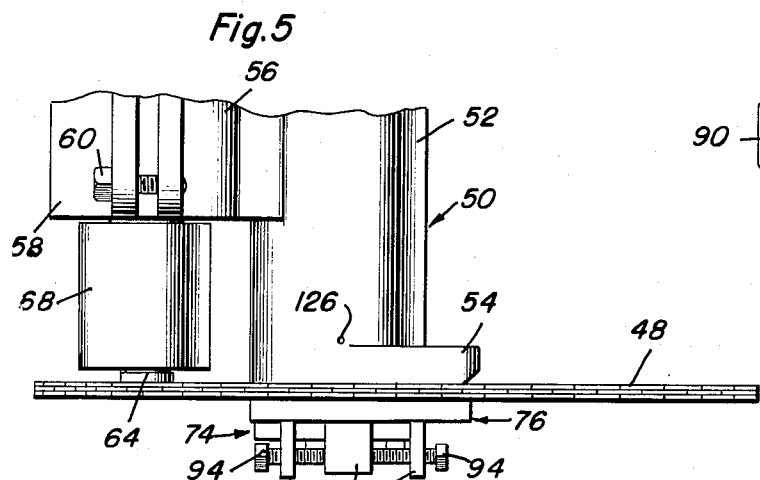
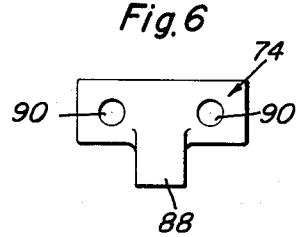
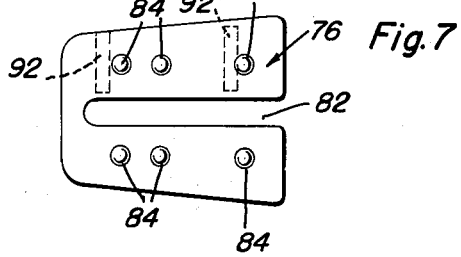
Sidney E. Surgi
INVENTOR.

United States Patent Office 2,748,809
Patented June 5, 1956

2,748,809

CHAIN SAW ATTACHMENT WITH LUBRICATING MEANS

Sidney E. Surgi, Webb City, Mo.

Application November 20, 1952, Serial No. 321,617

4 Claims. (Cl. 143—32)

This invention relates in general to saws and more specifically to a chain saw attachment for a portable power unit.

At the present time there are on the market numerous portable power units which are provided with vertical spindles having drive shafts rotatably mounted therein. These drive shafts are intended to have mounted thereon numerous tools including circular saws, mowers, etc. While the circular saw has proved to be very useful in the cutting down and sawing to desired lengths small trees, the power units are generally of insufficient capacity to turn a large circular saw of a size which would permit the cutting down of large trees. It is, therefore, the primary object of this invention to provide an improved an improved chain saw attachment which may be conveniently connected to such portable power unit whereby the same may function in a normal manner of portable chain saws and at the same time be easier to manipulate.

Another object of this invention is to provide an improved chain saw attachment which may be conveniently attached to a depending spindle and rotating drive shaft of a portable power unit, said chain saw attachment being so designed to facilitate the attachment thereof to the portable power unit without varying the construction of the power unit.

Another object of this invention is to provide an improved chain saw attachment for portable power units, said attachment utilizing chain saw elements readily obtainable on the market and requiring a minimum of adaptation for the formation thereof.

A further object of this invention is to provide an improved chain saw attachment which may be secured to portable power units including depending spindles having drive shafts rotatably mounted therein, said chain saw attachment being of a relatively rigid construction whereby the same may be rigidly secured to the power unit so as to function as if it were initially formed as part thereof.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is an enlarged longitudinal sectional view taken through the center of that portion of the chain saw attachment and power unit illustrated in Figure 2;

Figure 4 is a transverse vertical sectional view taken substantially upon the plane indicated by the section line 4—4 of Figure 3 and shows the general construction of the interior of a support member for the chain saw attachment and the arrangement of means for distributing lubricant disposed therein;

Figure 5 is an enlarged fragmentary side elevational view of the bottom portion of the spindle and shaft of the power unit and the rear portion of the chain saw attachment and shows the relationship of the two including the specific manner in which a chain blade is mounted and driven;

Figure 6 is a bottom plan view of one element utilized for the connection of a blade support to a supporting member of the chain saw attachment; and, Figure 7 is a top plan view of a second connecting member utilized in the adjustable connection of a blade support to the support member.

Figure 1:
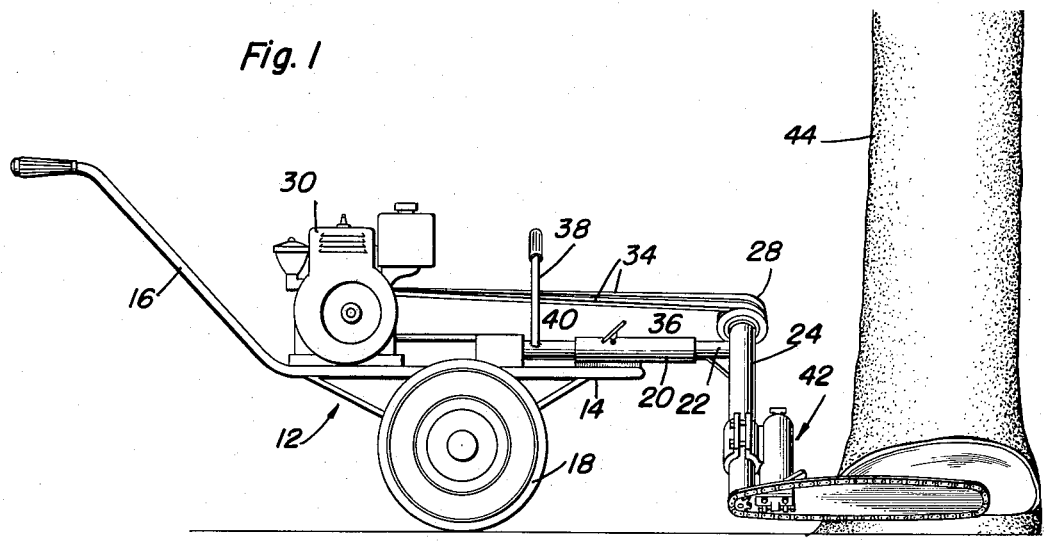
Figure 1 is a side elevational view of a portable power unit having mounted thereon the chain saw attachment which is the subject of this invention, the chain saw attachment being in the process of cutting down a large tree.
Figure 2:
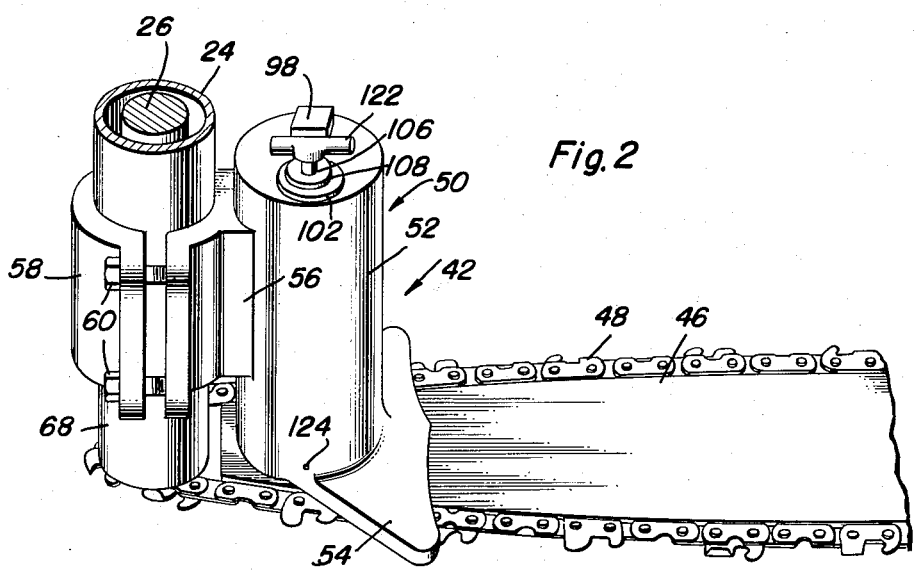
Figure 2 is an enlarged top perspective veiw of a rear portion of the chain saw attachment and shows its relationship to a lower portion of a depending spindle and drive shaft of the power unit of Figure 1.

Referring now to Figure 1 in particular, it will be seen that there is illustrated a portable power unit which is referred to in general by the reference numeral 12. The portable power unit 12 includes a frame 14 having extending rearwardly therefrom a handle construction 16. The frame 14 is mounted on a pair of wheels 18 so that the same may be highly portable.

Carried by the frame 14 and extending longitudinally thereof is an elongated sleeve 20 in which is mounted a horizontal support arm 22. Secured to the forward end of the support arm 22 is a spindle 24 in which is rotatably journalled a drive shaft 26. The drive shaft 26 extends upwardly out of the spindle 24 and has mounted thereon a pulley construction 28.

Mounted on the rear portion of the frame 14 is a gasoline engine 30 which is provided with a drive pulley construction (not shown) which is connected to the pulley construction 28 by drive belts 34 entrained thereover.

It is to be understood that it is intended that the spindle 24 be either disposed vertically or horizontally, although the same may be disposed at an angle to both. In order that the position of the spindle 24 may be adjusted, the sleeve 20 is provided with a lock screw 36 for retaining the support arm 22 in an adjusted position. The support arm 22 is longitudinally slidable within the sleeve 20 so as to vary the tension of the drive belts 34 for the different positions of the spindle 24. Movement of the support arm 22 and its associated spindle 24 is controlled by a handle 38 secured to the support arm 22 and extending through an opening 40 in the sleeve 20.

It will be noted that mounted on the lower portion of the spindle 24 and operatively connected to the drive shaft 26 is a chain saw attachment which is the subject of this invention, the chain saw attachment being referred to in general by the reference numeral 42. The chain saw attachment is illustrated in the process of cutting down a large tree 44.

The chain saw attachment 42 includes an elongated blade support 46 which has mounted about the peripheral edge thereof an endless chain blade 48. It will be understood that the blade support 46 and the chain blade 48 are conventional and will not be referred to in more detail.

The blade support 46 is adjustably secured to the spindle 24 by a support member which is referred to in general by the reference numeral 50. The support member 50 includes a tubular housing portion 52 which includes an enlarged generally triangular base 54, the base 54 extending forwardly of the vertical projection of the housing portion 52. The support member 50 also includes an integral clamp bracket 56 which has cooperating therewith a clamp half 58 for adjustably clamping the support member 50 to the spindle 54. The clamp half 58 is secured to the clamp bracket 56 by a plurality of fasteners 60 which are disposed on opposite sides of the spindle 24. Inasmuch as the support member 50 is clamped to the spindle 24, it will be seen that the same may be adjusted to the desired relationship with the same.

Referring now to Figure 3 in particular, it will be seen that the chain saw attachment 42 includes a drive sprocket 62 over which the chain blade 48 is entrained and which drives the same. The drive sprocket 62 includes an externally threaded shank 64 which is threaded in an internally threaded bore 66 of a tubular coupling member 68. The tubular coupling member 68 also includes an upper internally threaded bore 70 which has threadedly received therein a lower externally threaded end 72 of the drive shaft 26. It will be understood that the threads of the threaded portions of the spindle, the coupling member and the drive shaft are of reversed threads to the rotation of the drive shaft so that the same will have a tendency to tighten during the driving of the sprocket 62.

In order that the tension in the chain blade 48 may be adjusted, the blade support 46 is adjustably secured to the enlarged base 54 of the support member 50. The blade support is secured to the enlarged base 54 by first and second coupling members 74 and 76 which are secured in position by fasteners 78 passing therethrough and threadedly engaged in threaded bores 80 in the bottom of the base 54.

Referring now to Figure 7 in particular, it will be seen that the second connection member 76 is generally rectangular in outline, although it decreases slightly in width from the front end to the rear end thereof. The connection member 76 is provided with an elongated slot 82 which opens through the rear end thereof and through which the fasteners 78 are received. The connection member 76 is provided with a plurality of upstanding projections 84 on the top base thereof which are generally semi-spherical and which are received in aligned openings 86 in the blade support 46 in the manner best illustrated in Figure 4. It will be noted at this time that the chain blade 48 has been omitted from Figure 4 for purposes of clarity.

Referring now to Figure 6 in particular, it will be seen that the first connection member 74 is generally rectangular in outline and includes a centrally disposed downwardly projecting lug 88 at one side thereof. The lug 88 is of a greater thickness than the remainder of the connection member 74, as is best illustrated in Figure 4. The connection member 74 has provided in the body portion thereof a pair of longitudinally aligned apertures 90 through which the fasteners 78 pass.

Referring now to Figures 3 and 5 in particular, it will be seen that the first connection member 74 underlies the second connection member 76 and that the same clamps both the second connection member 76 and the rear end of the blade support 46 to the underside of the base 54. It will also be noted that the lug 88 of the first connection member 74 is disposed between downwardly extending ears 92 on the second connection member 76 and positioned by said screws 94 threadedly engaged in the ears 92. By adjusting the positions of the said screws 94, the second connection member 76 and the blade support 46 may be shifted longitudinally of the support member 50 so as to vary the tension in the chain blade 48.

Referring now to Figure 4 in particular, it will be seen that the housing portion 52 of the support member 50 is hollow and has an internally threaded filler opening 96 in the top wall thereof. The filler opening 96 is closed by a removable plug 98 and is adapted to have poured therein a suitable lubricant for lubricating the chain blade 48.

The top wall of the housing portion 52 is also provided with a second internally threaded opening 100 which has threaded therein a suitable bushing 102. Passing through a bore 104 in the lower portion of the bushing is an elongated valve control stem 106. The valve control stem 106 has mounted thereon a packing nut 108 which is threaded and an internally threaded opening 110 in the upper portion of the bushing 102, the opening 110 being concentric with the opening 104. Disposed in the bottom portion of the opening 110 and tightly surrounding the valve control stem 106 is suitable packing 112.

The valve control stem 106 passes through a vertical bore 114 in an intermediate support 116 carried by the inner wall by the housing portion 52. The lower end of the valve control stem 106 is externally threaded as at 118 and is threadedly engaged in a valve seat 120 for controlling the flow of oil out of the housing portion 52. The end portion of the valve control stem 106 which extends outwardly through the packing at 110 is provided with a suitable handle 122 for facilitating the rotation of the same.

Communicating with the bore through the valve seat 120, the bore being normally closed by the threaded lower end of the valve control stem 106, is a slant bore 124 which opens through the bottom of the base 54 and supplies lubricant to the top of the blade support 46.

The base 54 is also provided with a transversely disposed bore 126 which opens out through the sides thereof. The bore 126 communicates with the bore 124 and receives lubricant therefrom. Lubricant dripping out of the ends of the bores 126 are directed onto the edges of the blade support 46 and lubricates the chain blade in its travel thereby.

In view of the foregoing, it will be seen that there has been illustrated and described a chain saw attachment, the chain saw attachment 42, which may be conveniently and quickly attached to a spindle and a drive shaft of a conventional portable power unit to utilize the engine thereof. Inasmuch as the power weight of the chain saw attachment 42 is supported by the spindle 24, it will be seen that the same may be easily controlled and positioned through the utilization of the handle construction 16 attached to the frame 14, and the handle 38 attached to the support arm 32. Therefore, the chain saw attachment 42 may be made of a relatively large size and handled by one person. Also, by interchanging blade supports and chain blades it will be seen that the size of the chain saw attachment may be also varied.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A chain saw attachment for portable rotary tools including a vertical spindle having a drive shaft rotatably mounted therein, said attachment comprising a blade support, an endless chain blade mounted on said blade support for guided movement, means for securing said blade support to the spindle, drive means for said chain blade, means for securing said drive means to the drive shaft, said first mentioned means including a rigid support member having clamp means adjustably clamping the spindle, said support member being tubular and having a closed bottom end and adapted to contain lubricant, means for distributing the lubricant to said chain blade, said means comprising a bore in said bottom end of said tubular member communicating with the interior of said member and the upper surface of said blade support, a valve seat disposed in the end of said bore communicating with the interior of said tubular member, and a valve control rod disposed in said tubular member and engaging the valve seat for regulating the flow of lubricant to said bore.

2. The combination of claim 8, wherein said valve seat is internally threaded, said valve control rod being externally threaded and threadingly engaging said valve seat.

3. A chain saw attachment for portable rotary tools including a vertical spindle having a drive shaft rotatably mounted therein, said attachment comprising a blade support, an endless chain blade mounted on said blade support for guided movement, means for securing said blade support to the spindle, drive means for said chain blade, means for securing said drive means to the drive shaft, said first mentioned means including a rigid support member having clamp means for adjustably clamping the spindle, said support member being tubular and having a closed bottom end and adapted to contain lubricant, means for distributing the lubricant to said chain blade, said distributing means comprising a bore in said bottom end of said tubular member communicating with the interior of said member and the upper surface of said blade support, a valve seat disposed in the end of said bore communicating with the interior of said tubular member, a valve control rod disposed in said tubular member and engaging the valve seat for regulating the flow of lubricant to said bore, and a transverse bore in the bottom of said tubular member communicating with said first bore below said valve seat, said transverse bore permitting lubricant to flow from said tubular member to said chain blade.

4. The combination of claim 3 wherein said means for securing said blade support to the spindle also includes coupling members adjustable with respect to each other and secured respectively to said blade support and said tubular member so that said blade support may be adjusted to vary the blade tension.

References Cited in the file of this patent

UNITED STATES PATENTS

| | | |
|---|---|---|
| 21,179 | Barnes | Aug. 17, 1858 |
| 334,710 | Krutzsch | Jan. 19, 1886 |
| 780,476 | Bens | June 17, 1905 |
| 1,903,571 | Meyer | Apr. 11, 1933 |
| 2,316,996 | Smith | Apr. 20, 1943 |
| 2,348,588 | Arsneau | May 9, 1944 |
| 2,370,556 | Mall | Feb. 27, 1945 |
| 2,391,730 | Melvin et al. | Dec. 25, 1945 |
| 2,435,192 | Arsneau | Feb. 3, 1948 |

FOREIGN PATENTS

| | | |
|---|---|---|
| 850,443 | France | Sept. 11, 1939 |
| 118,817 | Australia | Aug. 14, 1944 |